(12) United States Patent
Jordan et al.

(10) Patent No.: US 7,871,446 B2
(45) Date of Patent: Jan. 18, 2011

(54) DISPERSE AZO DYESTUFFS

(75) Inventors: Hartwig Jordan, Bergisch-Gladbach (DE); Wolfgang Koster, Burscheid (DE); Anthony Lawrence, Manchester (GB)

(73) Assignee: DyStar Colours Deutschland KG, Frankfurt am Main (DE)

( * ) Notice: Subject to any disclaimer, the term of this patent is extended or adjusted under 35 U.S.C. 154(b) by 0 days.

(21) Appl. No.: 12/514,232

(22) PCT Filed: Nov. 2, 2007

(86) PCT No.: PCT/EP2007/061806

§ 371 (c)(1),
(2), (4) Date: Jun. 11, 2009

(87) PCT Pub. No.: WO2008/055846

PCT Pub. Date: May 15, 2008

(65) Prior Publication Data

US 2010/0009081 A1    Jan. 14, 2010

(30) Foreign Application Priority Data

Nov. 10, 2006 (GB) .................... 0622473.7

(51) Int. Cl.
*D06P 5/00* (2006.01)
*C09B 29/00* (2006.01)

(52) U.S. Cl. .............. 8/464; 8/662; 8/690; 8/691; 534/788

(58) Field of Classification Search .......... 8/464, 8/662, 690, 691; 534/788
See application file for complete search history.

(56) References Cited

U.S. PATENT DOCUMENTS

| | | | |
|---|---|---|---|
| 2,466,737 A | 4/1949 | Quattlebaum et al. | |
| 5,101,021 A | 3/1992 | Altermatt | |
| 5,428,138 A | 6/1995 | Buehler et al. | |
| 5,639,282 A | 6/1997 | Buehler | |

2004/0143108 A1    7/2004   Egli et al.

FOREIGN PATENT DOCUMENTS

WO    WO 02/069002 A1 *   9/2002
WO    WO-02/081572 A1   10/2002

OTHER PUBLICATIONS

STIC Search Report dated Feb. 12, 2010.*

* cited by examiner

*Primary Examiner*—Eisa B Elhilo
(74) *Attorney, Agent, or Firm*—Connolly Bove Lodge & Hutz LLP

(57) ABSTRACT

A dyestuff of the formula (I)

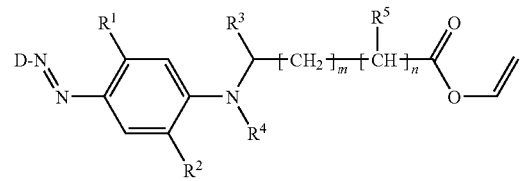

wherein
D is a diazo component;
$R^1$ is hydrogen, $(C_1-C_4)$-alkyl, hydroxy, —$NHCOR^6$ or —$NHSO_2R^6$;
$R^2$ is hydrogen, halogen or $(C_1-C_4)$-alkoxy;
$R^3$ is hydrogen or methyl;
$R^4$ is hydrogen, $(C_1-C_6)$-alkyl, substituted $(C_1-C_6)$-alkyl, $(C_2-C_6)$-alkyl, which is interrupted by 1, 2 or 3 heteroatoms wherein said heteroatoms are —O—, —S— or —$NR^7$, substituted $(C_2-C_6)$-alkyl, which is interrupted by 1, 2 or 3 heteroatoms wherein said heteroatoms are —O—, —S— or —$NR^7$, $(C_2-C_6)$-alkenyl, substituted $(C_2-C_6)$-alkenyl, benzyl or phenethyl;
$R^5$ is hydrogen or methyl;
$R^6$ is $(C_1-C_4)$-alkyl, phenyl or substituted phenyl;
$R^7$ is $(C_1-C_4)$-alkyl, phenyl or substituted phenyl;
m is 0, 1 or 2; and
n is 0 or 1. The invention further relates to use of the dyestuff and the process of making the dyestuff.

15 Claims, No Drawings

DISPERSE AZO DYESTUFFS

CROSS-REFERENCE TO RELATED APPLICATIONS

This application is a national stage application (under 35 U.S.C. §371) of PCT/EP2007/061806, filed Nov. 2, 2007, which claims benefit of United Kingdom application 0622473.7, filed Nov. 10, 2006.

BACKGROUND OF THE INVENTION

The present invention relates to the field of disperse dyes.

Disperse azo dyestuffs containing ester groups of unsaturated alcohols are known from literature. Especially, disperse azo dyestuffs containing allyl ester groups in the coupling component are well known and described for example in U.S. Pat. Nos. 5,428,138, 5,639,282 and US 2004/0143108 A1.

BRIEF SUMMARY OF THE INVENTION

The invention is directed to a dyestuff of the formula (I)

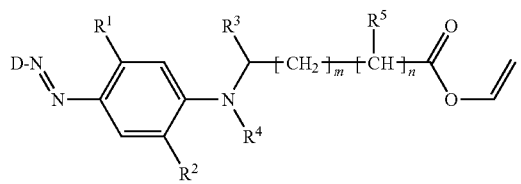

(I)

wherein
D is a diazo component;
$R^1$ is hydrogen, $(C_1-C_4)$-alkyl, hydroxy, —NHCOR$^6$ or —NHSO$_2$R$^6$;
$R^2$ is hydrogen, halogen or $(C_1-C_4)$-alkoxy;
$R^3$ is hydrogen or methyl;
$R^4$ is hydrogen, $(C_1-C_6)$-alkyl, substituted $(C_1-C_6)$-alkyl, $(C_2-C_6)$-alkyl, which is interrupted by 1, 2 or 3 heteroatoms wherein said heteroatoms are —O—, —S— or —NR$^7$, substituted $(C_2-C_6)$-alkyl, which is interrupted by 1, 2 or 3 heteroatoms wherein said heteroatoms are —O—, —S—or —NR$^7$, $(C_2-C_6)$-alkenyl, substituted $(C_2-C_6)$-alkenyl, benzyl or phenethyl;
$R^5$ is hydrogen or methyl;
$R^6$ is $(C_1-C_4)$-alkyl, phenyl or substituted phenyl;
$R^7$ is $(C_1-C_4)$-alkyl, phenyl or substituted phenyl;
m is 0, 1 or 2; and
n is 0 or 1.

Another embodiment of the invention is the use of the dyestuff according to the formula (I) and the process of making the dyestuff according to the formula (I).

The inventors of the present invention have surprisingly found that dyeings on polyester with improved wash fastness properties compared to standard dyes for hydrophobic fibers can be obtained if dyestuffs containing a vinyl ester group in the coupling component as defined below are used.

DETAILED DESCRIPTION OF THE INVENTION

The present invention claims dyestuffs of the formula (I)

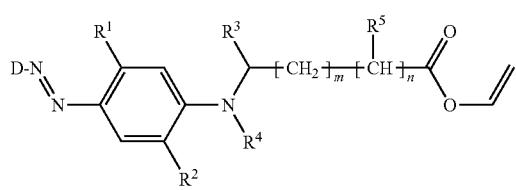

(I)

wherein
D is a diazo component;
$R^1$ is hydrogen, $(C_1-C_4)$-alkyl, hydroxy, —NHCOR$^6$ or —NHSO$_2$R$^6$;
$R^2$ is hydrogen, halogen or $(C_1-C_4)$-alkoxy;
$R^3$ is hydrogen or methyl;
$R^4$ is hydrogen, $(C_1-C_6)$-alkyl, substituted $(C_1-C_6)$-alkyl, $(C_2-C_6)$-alkyl, which is interrupted by 1, 2 or 3 heteroatoms selected from the group consisting of —O—, —S— and —NR$^7$, substituted $(C_2-C_6)$-alkyl, which is interrupted by 1, 2 or 3 heteroatoms selected from the group consisting of —O—, —S— and —NR$^7$, $(C_2-C_6)$-alkenyl, substituted $(C_2-C_6)$-alkenyl, benzyl or phenethyl;
$R^5$ is hydrogen or methyl;
$R^6$ is $(C_1-C_4)$-alkyl, phenyl or substituted phenyl;
$R^7$ is $(C_1-C_4)$-alkyl, phenyl or substituted phenyl;
m is 0, 1 or 2; and
n is 0 or 1.

Diazo components D can be all diazo components which are used for the preparation of disperse dyes. Such coupling components are described in literature and known to a person of ordinary skill in the art.

Preferred diazo components D are of the formula (IIa)

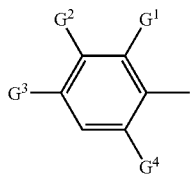

(IIa)

wherein
$G^1$ is hydrogen, halogen, cyano or nitro;
$G^2$ is hydrogen, halogen or nitro;
$G^3$ is hydrogen, halogen, methylsulfonyl, fluorosulfonyl or nitro; and
$G^4$ is hydrogen, halogen, trifluoromethyl, cyano or nitro;

or of the formula (IIb)

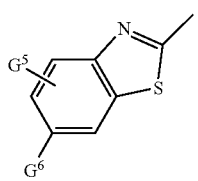

(IIb)

wherein
$G^5$ is hydrogen or halogen; and
$G^6$ is hydrogen, halogen, nitro, —SO$_2$CH$_3$ or —SCN;

or of the formula (IIc)

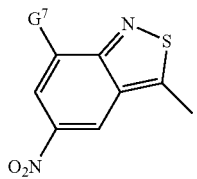

wherein

G$^7$ is hydrogen or halogen;

or of the formula (IId)

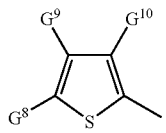

(IId)

wherein

G$^8$ is nitro, cyano, —CHO or a group of the formula (IIe)

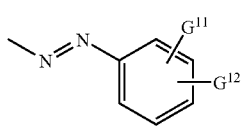

(IIe)

wherein G$^{11}$ and G$^{12}$ are independently hydrogen, halogen, nitro or cyano;

G$^9$ is hydrogen or halogen; and

G$^{10}$ is nitro, cyano, —COCH$_3$ or —COO—G$^{13}$, wherein G$^{13}$ is C$_1$-C$_4$ alkyl;

or of the formula (IIf).

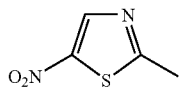

(IIf)

Especially preferred examples of D derive from the following amines: 3,4-dichloroaniline, 2-trifluoromethyl-4-nitroaniline, 2-nitroaniline, 3-nitroaniline, 4-nitroaniline, 2-chloro-4-nitroaniline, 4-chloro-2-nitroaniline, 2-bromo-4-nitroaniline, 2-chloro-4-methylsulfonylaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-chloro-4-nitroaniline, 2-cyano-6-bromo-4-nitroaniline, 2,4-dintroaniline, 2-chloro-4,6-dinitroaniline, 2-bromo-4,6-dinitroaniline, 2-amino-5-nitrothiazole, 2-amino-3,5-dinitrothiophene, 2-amino-5-nitrothiophene-3-carboxylic acid ethyl ester, 2-amino-3-cyano-4-chloro-5-formylthiophene, 2-amino-5-(4-nitrophenylazo)-thiophene-3-carbonitrile, 7-amino-5-nitrobenzoisothiazole, 2-amino-6-nitrobenzothiazole, 2-amino-6-methylsulfonylbenzothiazole, 2-amino-6-thiocyanatobenzothiazole and 2-amino-5,6/6,7-dichlorobenzothiazole.

In the definitions of the present specification alkyl groups may be straight-chain or branched and are preferably methyl, ethyl, n-propyl, i-propyl or n-butyl. Alkyl groups of up to 6 carbon atoms can additonally also be pentyl or hexyl. The same logic applies to alkoxy groups which are preferably methoxy, ethoxy or propoxy and to alkenyl groups, which are preferably vinyl and allyl.

Examples of (C$_2$-C$_6$)-alkyl groups which are interrupted by 1, 2 or 3 heteroatoms selected from the group consisting of —O—, —S— and —NR$^7$—, are —CH$_2$—O—CH$_2$—, —(CH$_2$)$_2$—O—(CH$_2$)$_2$—, —CH$_2$—S—CH$_2$—, —(CH$_2$)$_2$—S—(CH$_2$)$_2$—, —CH$_2$—N R$^{7'}$—CH$_2$— or —(CH$_2$)$_2$—NR$^{7'}$—(CH$_2$)$_2$—, wherein R$^{7'}$ is hydrogen or methyl. Substituents of alkyl, interrupted alkyl or alkenyl groups are preferably hydroxy, cyano, halogen, —COOH, —COOR$^8$, —OC(O)R$^8$, amino, —NHC(O)R$^8$ and —NHSO$_2$R$^8$ wherein R$^8$ is (C$_1$-C$_4$)-alkyl, phenyl or substituted phenyl. Substituted phenyl groups carry 1, 2 or 3 substituents. Examples of such substituents are (C$_1$-C$_6$)-alkyl, (C$_1$-C$_6$)-alkoxy, halogen, cyano and nitro. Halogen is preferably fluorine, chlorine or bromine, wherein in case of G$^1$, G$^2$, G$^3$, G$^4$, G$^5$, G$^6$, G$^7$, G$^9$, G$^{11}$ and G$^{12}$ halogen is especially preferably chlorine or bromine.

In preferred dyestuffs of the formula (I)

R$^1$ is hydrogen, methyl or —NHCOCH$_3$;

R$^2$ is hydrogen, chloro, methoxy or ethoxy;

R$^3$ is hydrogen or methyl;

R$^4$ is hydrogen, methyl, ethyl, n-propyl, i-propyl, n-butyl, sec-butyl, i-butyl, tert.-butyl, benzyl, —CH$_2$—O—CH$_2$— or —(CH$_2$)$_2$—O—(CH$_2$)$_2$—;

R$^5$ is hydrogen or methyl;

m is 0,1 or 2;

n is 0 or 1; and

D is defined as given above or has preferably one of the meanings of formulae (IIa) to (IIf).

In especially preferred dyestuffs of the formula (I)

R$^1$ is hydrogen, methyl or —NHCOCH$_3$;

R$^2$ is hydrogen, chloro, methoxy or ethoxy;

R$^3$ is hydrogen or methyl;

R$^4$ is hydrogen, methyl, ethyl, n-propyl, i-propyl, n-butyl, sec-butyl, i-butyl, tert.-butyl, benzyl, —CH$_2$—O—CH$_2$— or —(CH$_2$)$_2$—O—(CH$_2$)$_2$—;

R$^5$ is hydrogen or methyl;

m is 0, 1 or 2;

n is 0 or 1; and

D derives from 3,4-dichloroaniline, 2-trifluoromethyl-4-nitroaniline, 2-nitroaniline, 3-nitroaniline, 4-nitroaniline, 2-chloro-4-nitroaniline, 4-chloro-2-nitroaniline, 2-bromo-4-nitroaniline, 2-chloro-4-methylsulfonylaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-chloro-4-nitroaniline, 2-cyano-6-bromo-4-nitroaniline, 2,4-dintroaniline, 2-chloro-4,6-dinitroaniline, 2-bromo-4,6-dinitroaniline, 2-amino-5-nitrothiazole, 2-amino-3, 5-dinitrothiophene, 2-amino-5-nitrothiophene-3-carboxylic acid ethyl ester, 2-amino-3-cyano-4-chloro-5-formyl-thiophene, 2-amino-5-(4-nitrophenylazo)-thiophene-3-carbonitrile, 7-amino-5-nitrobenzoisothiazole, 2-amino-6-nitrobenzothiazole, 2-amino-6-methylsulfonyl-benzothiazole, 2-amino-6-thiocyanatobenzothiazole or 2-amino-6,7-dichloro-benzothiazole.

Further especially preferred dyestuffs of the formula (I) correspond to the formula (Ia)

(Ia)

wherein

G$^1$ is hydrogen, chlorine, bromine, cyano or nitro;

G$^2$ is hydrogen, chlorine or nitro;

G$^3$ is hydrogen, chlorine, nitro or methylsulfonyl;

$G^4$ is hydrogen, chlorine, bromine, trifluormethyl, cyano or nitro;
$R^1$ is hydrogen, methyl or —NHCOCH$_3$;
$R^2$ is hydrogen or methoxy; and
$R^4$ is hydrogen, ethyl, butyl or benzyl.

Still further especially preferred dyestuffs of the formula (I) correspond to the formula (Ib)

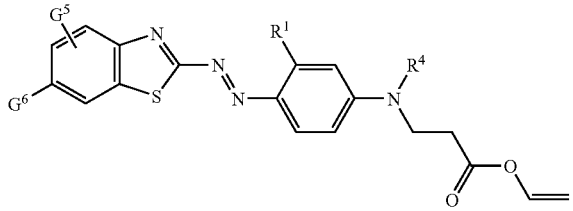

(Ib)

wherein
$G^5$ is hydrogen or chlorine;
$G^6$ is chlorine, nitro, —SO2CH3 or —SCN;
$R^1$ is hydrogen or methyl; and
$R^4$ is ethyl or benzyl.

Still further especially preferred dyestuffs of the formula (I) correspond to the formula (Ic)

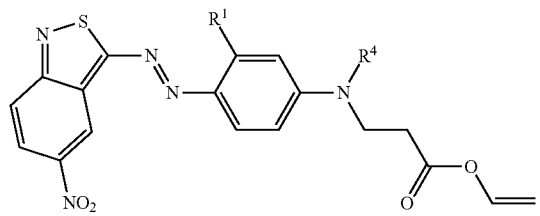

(Ic)

wherein
$R^1$ is hydrogen or methyl; and
$R^4$ is ethyl or benzyl.

Still further especially preferred dyestuffs of the formula (I) correspond to the formula (Id)

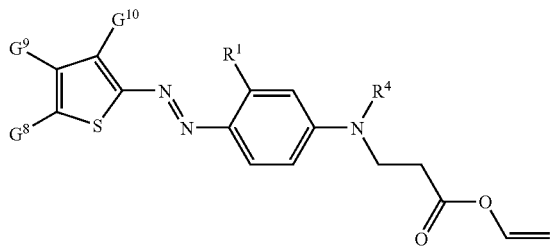

(Id)

wherein
$G^8$ is nitro, —CHO or —N=N—C$_6$H$_4$-p-NO$_2$;
$G^9$ is hydrogen or chlorine;
$G^{10}$ is nitro, cyano or —COOC$_2$H$_5$;
$R^1$ is hydrogen or methyl; and
$R^4$ is ethyl or benzyl.

Still further especially preferred dyestuffs of the formula (I) correspond to the formula (Ie)

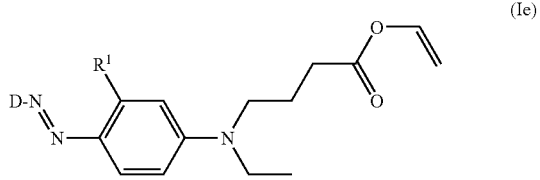

(Ie)

wherein
$R^1$ is hydrogen or methyl; and
D has one of the meanings of formulae (IIa) to (IIf) and preferably derives from 3,4-dichloroaniline, 2-trifluoromethyl-4-nitroaniline, 2-nitroaniline, 3-nitroaniline, 4-nitroaniline, 2-chloro-4-nitroaniline, 4-chloro-2-nitroaniline, 2-bromo-4-nitroaniline, 2-chloro-4-methylsulfonylaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-chloro-4-nitroaniline, 2-cyano-6-bromo-4-nitroaniline, 2,4-dintroaniline, 2-chloro-4,6-dinitroaniline, 2-bromo-4,6-dinitroaniline, 2-amino-5-nitrothiazole, 2-amino-3,5-dinitrothiophene, 2-amino-5-nitrothiophene-3-carboxylic acid ethyl ester, 2-amino-3-cyano-4-chloro-5-formyl-thiophene, 2-amino-5-(4-nitrophenylazo)-thiophene-3-carbonitrile, 7-amino-5-nitrobenzoisothiazole, 2-amino-6-nitrobenzothiazole, 2-amino-6-methylsulfonyl-benzothiazole, 2-amino-6-thiocyanatobenzothiazole or 2-amino-6,7-dichloro-benzothiazole and especially preferably from 2-cyano-4-nitroaniline, 2-cyano-6-bromo-4-nitroaniline, 2-amino-6-nitrobenzothiazole or 7-amino-5-nitrobenzo-isothiazole.

Still further especially preferred dyestuffs of the formula (I) correspond to the formula (If)

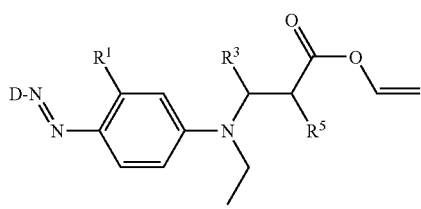

(If)

wherein
$R^1$ is hydrogen or methyl;
$R^3$ is hydrogen or methyl;
$R^5$ is hydrogen or methyl; and
D has one of the meanings of formulae (IIa) to (IIf) and preferably derives from 3,4-dichloroaniline, 2-trifluoromethyl-4-nitroaniline, 2-nitroaniline, 3-nitroaniline, 4-nitroaniline, 2-chloro-4-nitroaniline, 4-chloro-2-nitroaniline, 2-bromo-4-nitroaniline, 2-chloro-4-methylsulfonylaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-chloro-4-nitroaniline, 2-cyano-6-bromo-4-nitroaniline, 2,4-dintroaniline, 2-chloro-4,6-dinitroaniline, 2-bromo-4,6-dinitroaniline, 2-amino-5-nitrothiazole, 2-amino-3,5-dinitrothiophene, 2-amino-5-nitrothiophene-3-carboxylic acid ethyl ester, 2-amino-3-cyano-4-chloro- 5-formyl-thiophene, 2-amino-5-(4-nitrophenylazo)-thiophene-3-carbonitrile, 7-amino-5-nitrobenzoisothiazole, 2-amino-6-nitrobenzothiazole, 2-amino-6-methylsulfonyl-benzothiazole, 2-amino-6-thiocyanatobenzothiazole or 2-amino-6,7-dichloro-benzothiazole and especially preferably from 2-cyano-4-nitroaniline, 2-chloro-4-nitroaniline, 2-cyano-6-bromo-4-nitroaniline, 2-amino-6-nitrobenzothiazole or 7-amino-5-nitrobenzo-isothiazole.

The dyestuffs of the formula (I) may be obtained by usual methods for the preparation of azo compounds such as by diazotisation of an amine of the formula (III)

$$D-NH_2 \quad (III)$$

wherein D is defined as given above,
and coupling onto a compound of the formula (IV)

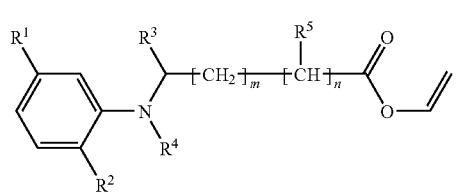

wherein $R^1$ to $R^5$, m and n are defined as given above.

Typically the amine of the formula (III) may be diazotised in an acidic medium, such as acetic, propionic or hydrochloric acid using a nitrosating agent such as nitrosylsulphuric acid, sodium nitrite or methylnitrite at a temperature from −10° C. to 10° C. Coupling onto the compound of the formula (IV) may be achieved by adding the diazotised amine to the compound of the formula (IV) under conditions described in literature and known to the skilled persons.

After coupling the compound of the formula (I) may be recovered from the reaction mixture by any convenient means such as filtration.

Vinylester containing compounds of the formula (IV) can be prepared from commercially available or literature described starting materials by a number of ways which are known to a person of ordinary skill in the art and which are described in literature. The enol ester function can for example be obtained as described in Organic Synthesis, J. Wiley and sons, Inc., Collective Volume IV, page 977. The required enol acetate precurors can be purchased o-r prepared. Synthesis of enol acetate compounds is described in for example U.S. Pat. No. 2,466,737.

The compounds of the formulae (III) are known or are easily prepared under standard conditions known to those skilled in the art.

The dyestuffs of the formula (I) are useful for dyeing and printing of synthetic textile material particularly polyester textile materials and fibre blends thereof with for example cellulosic materials like cotton, to which they impart colours which have excellent wash fastness properties.

Dyeing of the fiber goods mentioned with the dyestuffs of the formula (I) can be carried out in a manner known per se, preferably from aqueous dispersions, if appropriate in the presence of carriers, at between 80 and 110° C., by the exhaust process or by the HT process in a dyeing autoclave at 110 to 140° C., and by the so-called thermofixing process, in which the goods are padded with the dye liquor and then fixed at about 180 to 230° C.

The fiber goods mentioned can as well be printed in a manner known per se by a procedure in which the dyestuffs of the formula (I) are incorporated into a printing paste and the goods printed with the paste are treated, if appropriate in the presence of a carrier, with HT steam, pressurized steam or dry heat at temperatures between 180 and 230° C. to fix the dyestuff.

The dyestuffs of the formula (I) should be present in the finest possible dispersion in the dye liquors and printing pastes employed in the above applications. The fine dispersion of the dyestuffs is effected in a manner known per se by a procedure in which the dyestuff obtained during preparation is suspended in a liquid medium, preferably in water, together with dispersing agents and the mixture is exposed to the action of shearing forces, the particles originally present being comminuted mechanically to the extent that an optimum specific surface area is achieved and sedimentation of the dyestuff is as low as possible. The particle size of the dyestuffs is in general between 0.5 and 5 μm, preferably -about 1 μm. The dispersing agents used can be nonionic or anionic. Nonionic dispersing agents are, for example, reaction products of alkylene oxides, such as, for example, ethylene oxide or propylene oxide, with alkylatable compounds, such as for example fatty alcohols, fatty amines, fatty acids, phenols, alkylphenols and carboxylic acid amines. Anionic dispersing agents are, for example, lignin-sulphonates, alkyl- or alkylarylsulphonates or alkylaryl polyglycol ethersulphates.

For most methods of use, the dyestuff formulations thus obtained should be pourable. The dyestuff and dispersing agent content is therefore limited in these cases. In general, the dispersions are brought to a dyestuff content of up to 50 percent by weight and a dispersing agent content of up to 25 percent by weight. For economic reasons, the dyestuff contents usually do not fall below 15 percent by weight.

The dispersions can also comprise other auxiliaries, for example those which act as oxidizing agents or fungicidal agents. Such agents are well known in the art. The dyestuff dispersion thus obtained can be used very advantageously for the preparation of printing pastes and dye liquors.

For certain fields of use, powder formulations are preferred. These powders comprise the dyestuff, dispersing agents and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

In addition, the inventive dyestuffs of formula (I) can advantageously be used in inks for digital ink jet printing.

Consequently, the present invention also refers to an ink for injet printing which contains at least one dyestuff of the formula (I).

Inks for use in digital ink jet printing usually are aqueous inks and further comprise from 0.1% to 20% of a dispersant. Useful dispersants include for example sulfonated or sulfomethylated lignins, formaldehyde condensates of aromatic sulfonic acids, formaldehyde condensates of substituted or unsubstituted phenol derivatives, polyacrylates and copolymers thereof, styrene oxide polyethers, modified polyurethanes, reaction products of alkylene oxides with alkylatable compounds such as for example fatty alcohols, fatty amines, fatty acids, carboxamides, resin acids and also substituted or unsubstituted phenols.

Inks to be used in the continuous flow process can be adjusted to a conductivity in the range from 0.5 to 25 mS/cm by addition of electrolyte.

Useful electrolytes include for example lithium nitrate and potassium nitrate. In addition the inventive inks may further comprise typical ink jet organic solvents in a total amount of 1-60% and preferably of 5-40% by weight.

EXAMPLE 1

3-{[4-(2-Chloro-4-nitrophenylazo)-phenyl]-ethyl-amino}-propionic acid vinyl ester

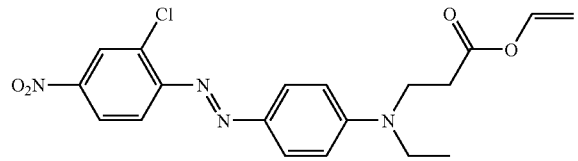

5.2 parts of 2-chloro-4-nitroaniline, 20 parts of propionic acid and 30 parts of acetic acid were charged and cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 6.5 parts of 3-(ethyl-phenyl-amino)-propionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 9.9 parts of 3-{[4-(2-chloro-4-nitrophenylazo)-phenyl]-ethyl-amino}-propionic acid vinyl ester. λmax=510 nm (DMF).

When applied to polyester materials from an aqueous dispersion, red shades with excellent wet and light fastness properties were seen.

According to the procedure outlined in Example 1, the dyes of the formula (Ia) of Examples 2 to 64 of Table 1 were prepared.

TABLE 1

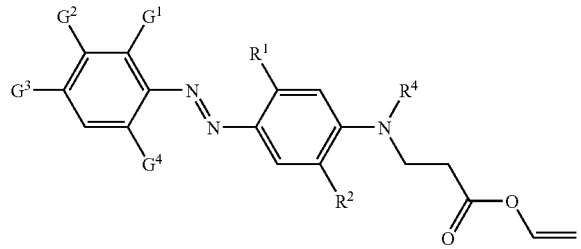

(Ia)

| Example | $G^1$ | $G^2$ | $G^3$ | $G^4$ | $R^1$ | $R^2$ | $R^4$ | λmax (nm) DMF |
|---|---|---|---|---|---|---|---|---|
| 2 | Cl | H | $NO_2$ | Cl | H | H | $C_2H_5$ | 432* |
| 3 | Cl | H | $NO_2$ | Br | H | H | $C_2H_5$ | 448 |
| 4 | Br | H | $NO_2$ | Br | H | H | $C_2H_5$ | 446 |
| 5 | Cl | H | $NO_2$ | Cl | H | H | $C_4H_9$ | 450 |
| 6 | Cl | H | $NO_2$ | Br | H | H | $C_4H_9$ | 450 |
| 7 | Br | H | $NO_2$ | Br | H | H | $C_4H_9$ | 448 |
| 8 | Cl | H | $NO_2$ | Cl | H | H | $CH_2C_6H_5$ | 436 |
| 9 | Cl | H | $NO_2$ | Br | H | H | $CH_2C_6H_5$ | 436 |
| 10 | Br | H | $NO_2$ | Br | H | H | $CH_2C_6H_5$ | 438 |
| 11 | H | Cl | Cl | H | H | H | $C_2H_5$ | 433* |
| 12 | H | H | $NO_2$ | H | H | H | $C_2H_5$ | 481 |
| 13 | H | H | $NO_2$ | $CF_3$ | H | H | $C_2H_5$ | 516 |
| 14 | H | H | $NO_2$ | H | $CH_3$ | H | $C_2H_5$ | 500 |
| 15 | $NO_2$ | H | H | H | $CH_3$ | H | $C_2H_5$ | 496 |
| 16 | H | $NO_2$ | H | H | $CH_3$ | H | $C_2H_5$ | 484 |
| 17 | Cl | H | $NO_2$ | H | $CH_3$ | H | $C_2H_5$ | 525 |
| 18 | Cl | H | $SO_2CH_3$ | H | $CH_3$ | H | $C_2H_5$ | 468* |
| 19 | $NO_2$ | H | Cl | H | $CH_3$ | H | $C_2H_5$ | 518 |
| 20 | Br | H | $NO_2$ | H | $CH_3$ | H | $C_2H_5$ | 523 |
| 21 | Cl | H | $NO_2$ | Cl | $CH_3$ | H | $C_2H_5$ | 462 |
| 22 | Cl | H | $NO_2$ | Br | $CH_3$ | H | $C_2H_5$ | 466 |
| 23 | Br | H | $NO_2$ | Br | $CH_3$ | H | $C_2H_5$ | 466 |
| 24 | H | Cl | $NO_2$ | Cl | $CH_3$ | H | $C_2H_5$ | 522 |
| 25 | H | H | $NO_2$ | $CF_3$ | $CH_3$ | H | $C_2H_5$ | 530 |
| 26 | CN | H | $NO_2$ | Cl | $CH_3$ | H | $C_2H_5$ | 562 |
| 27 | CN | H | $NO_2$ | Br | $CH_3$ | H | $C_2H_5$ | 560 |
| 28 | Cl | H | $NO_2$ | $NO_2$ | $CH_3$ | H | $C_2H_5$ | 560 |
| 29 | CN | H | $NO_2$ | H | $CH_3$ | H | $C_2H_5$ | 551 |
| 30 | $NO_2$ | H | $NO_2$ | H | $CH_3$ | H | $C_2H_5$ | 552 |
| 31 | Br | H | $NO_2$ | $NO_2$ | $CH_3$ | H | $C_2H_5$ | 558 |
| 32 | H | H | $NO_2$ | H | $CH_3$ | H | $C_4H_9$ | 506 |
| 33 | Cl | H | $NO_2$ | H | $CH_3$ | H | $C_4H_9$ | 528 |
| 34 | Cl | H | $NO_2$ | Cl | $CH_3$ | H | $C_4H_9$ | 470 |
| 35 | Cl | H | $NO_2$ | Br | $CH_3$ | H | $C_4H_9$ | 471 |
| 36 | Br | H | $NO_2$ | Br | $CH_3$ | H | $C_4H_9$ | 468 |
| 37 | CN | H | $NO_2$ | Cl | $CH_3$ | H | $C_4H_9$ | 564 |
| 38 | CN | H | $NO_2$ | Br | $CH_3$ | H | $C_4H_9$ | 566 |
| 39 | Cl | H | $NO_2$ | $NO_2$ | $CH_3$ | H | $C_4H_9$ | 567 |
| 40 | CN | H | $NO_2$ | H | $CH_3$ | H | $C_4H_9$ | 558 |
| 41 | $NO_2$ | H | $NO_2$ | H | $CH_3$ | H | $C_4H_9$ | 555 |

TABLE 1-continued (Ia)

[Structure shown: substituted phenylazo compound with groups $G^1, G^2, G^3, G^4$ on one ring and $R^1, R^2, R^4$ and vinyl propanoate ester on the other]

| Example | $G^1$ | $G^2$ | $G^3$ | $G^4$ | $R^1$ | $R^2$ | $R^4$ | λmax (nm) DMF |
|---|---|---|---|---|---|---|---|---|
| 42 | Br | H | $NO_2$ | $NO_2$ | $CH_3$ | H | $C_4H_9$ | 564 |
| 43 | $NO_2$ | H | H | H | $CH_3$ | H | $CH_2C_6H_5$ | 494 |
| 44 | $NO_2$ | H | Cl | H | $CH_3$ | H | $CH_2C_6H_5$ | 514 |
| 45 | Cl | H | $NO_2$ | Cl | $CH_3$ | H | $CH_2C_6H_5$ | 424* |
| 46 | Cl | H | $NO_2$ | Br | $CH_3$ | H | $CH_2C_6H_5$ | 460 |
| 47 | Br | H | $NO_2$ | Br | $CH_3$ | H | $CH_2C_6H_5$ | 462 |
| 48 | CN | H | $NO_2$ | Cl | $CH_3$ | H | $CH_2C_6H_5$ | 556 |
| 49 | CN | H | $NO_2$ | Br | $CH_3$ | H | $CH_2C_6H_5$ | 556 |
| 50 | Cl | H | $NO_2$ | $NO_2$ | $CH_3$ | H | $CH_2C_6H_5$ | 553 |
| 51 | CN | H | $NO_2$ | H | $CH_3$ | H | $CH_2C_6H_5$ | 544 |
| 52 | $NO_2$ | H | $NO_2$ | H | $CH_3$ | H | $CH_2C_6H_5$ | 546 |
| 53 | Br | H | $NO_2$ | $NO_2$ | $CH_3$ | H | $CH_2C_6H_5$ | 552 |
| 54 | Cl | H | $NO_2$ | H | NHAc | H | $C_2H_5$ | 542 |
| 55 | $NO_2$ | H | $NO_2$ | H | NHAc | H | $C_2H_5$ | 556 |
| 56 | Br | H | $NO_2$ | CN | NHAc | H | $C_2H_5$ | 590 |
| 57 | $NO_2$ | H | $NO_2$ | Cl | NHAc | H | $C_2H_5$ | 568 |
| 58 | $NO_2$ | H | $NO_2$ | Br | NHAc | H | $C_2H_5$ | 566 |
| 59 | $NO_2$ | H | $NO_2$ | H | NHAc | $OCH_3$ | H | 576 |
| 60 | $NO_2$ | H | $NO_2$ | Cl | NHAc | $OCH_3$ | H | 594 |
| 61 | $NO_2$ | H | $NO_2$ | Br | NHAc | $OCH_3$ | H | 594 |
| 62 | $NO_2$ | H | $NO_2$ | H | NHAc | $OCH_3$ | $C_2H_5$ | 591 |
| 63 | $NO_2$ | H | $NO_2$ | Cl | NHAc | $OCH_3$ | $C_2H_5$ | 598* |
| 64 | $NO_2$ | H | $NO_2$ | Br | NHAc | $OCH_3$ | $C_2H_5$ | 611 |

*=λmax measured in acetone

EXAMPLE 65

3-{[4-(5,6/6,7-Dichlorobenzothiazol-2-ylazo)-phenyl]-ethyl-amino}-propionic acid vinyl ester

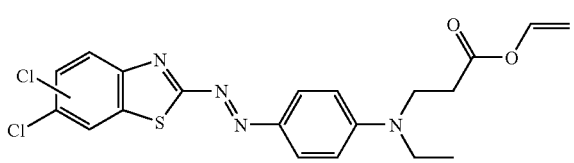

6.5 parts of 2-amino-5,6/6,7-dichlorobenzothiazole, 20 parts of propionic acid and 30 parts of acetic acid were charged and cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 6.5 parts of 3-(ethyl-phenyl-amino)-propionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 11.7 parts of 3-{[4-(5,6/6,7-dichlorobenzothiazol-2-ylazo)-phenyl]-ethyl-amino}-propionic acid vinyl ester. λmax=530 nm (DMF).

When applied to polyester materials from an aqueous dispersion, red shades with excellent wet and light fastness properties were seen.

According to the procedure outlined in Example 65, the dyes of the formula (Ib) of Examples 66 to 80 of Table 2 were prepared.

TABLE 2

(Ib)

[Structure: benzothiazole coupled via azo to substituted aniline with propanoate vinyl ester, groups $G^5, G^6, R^1, R^4$]

| Example | $G^6$ | $G^5$ | $R^1$ | $R^4$ | λmax (nm) DMF |
|---|---|---|---|---|---|
| 66 | Cl | 5/7-Cl | H | $CH_2C_6H_5$ | 525 |
| 67 | $NO_2$ | H | H | $C_2H_5$ | 550 |
| 68 | $NO_2$ | H | H | $CH_2C_6H_5$ | 542 |
| 69 | $SO_2CH_3$ | H | H | $C_2H_5$ | 538 |
| 70 | $SO_2CH_3$ | H | H | $CH_2C_6H_5$ | 526 |
| 71 | SCN | H | H | $C_2H_5$ | 540 |
| 72 | SCN | H | H | $CH_2C_6H_5$ | 532 |
| 73 | Cl | 5/7-Cl | $CH_3$ | $C_2H_5$ | 542 |
| 74 | Cl | 5/7-Cl | $CH_3$ | $CH_2C_6H_5$ | 540 |
| 75 | $NO_2$ | H | $CH_3$ | $C_2H_5$ | 562 |

TABLE 2-continued (Ib)

[Structure Ib]

| Example | G⁶ | G⁵ | R¹ | R⁴ | λmax (nm) DMF |
|---|---|---|---|---|---|
| 76 | NO₂ | H | CH₃ | CH₂C₆H₅ | 554 |
| 77 | SO₂CH₃ | H | CH₃ | C₂H₅ | 549 |
| 78 | SO₂CH₃ | H | CH₃ | CH₂C₆H₅ | 542 |
| 79 | SCN | H | CH₃ | C₂H₅ | 551 |
| 80 | SCN | H | CH₃ | CH₂C₆H₅ | 544 |

TABLE 3

(Ic)

[Structure Ic]

| Example | R¹ | R⁴ | λmax (nm) DMF |
|---|---|---|---|
| 82 | H | CH₂C₆H₅ | 594 |
| 83 | CH₃ | C₂H₅ | 620 |
| 84 | CH₃ | CH₂C₆H₅ | 610 |

EXAMPLE 81

3-{Ethyl-[4-(5-nitro-benzo[c]isothiazol-3-ylazo)-phenyl]-amino}-propionic acid vinyl ester

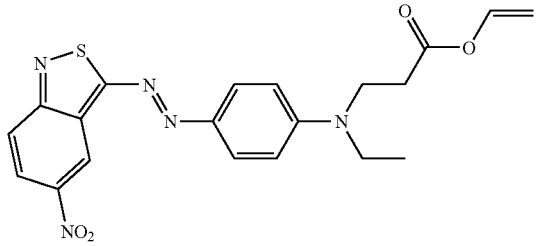

5.9 parts of 7-amino-5-nitrobenzisothiazole, 30 parts of 98% sulfuric acid and 8 parts of 85% phosphoric acid were charged, heated at 60° C. for 30 mins, then cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 6.5 parts of 3-(ethyl-phenyl-amino)-propionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 10.1 parts of 3-{ethyl-[4-(5-nitro-benzo[c] isothiazol-3-ylazo)-phenyl]-amino}-propionic acid vinyl ester. λmax=606 nm (DMF).

When applied to polyester materials from an aqueous dispersion, blue shades with excellent wet and light fastness properties were seen.

According to the procedure outlined in Example 81, the dyes of the formula (Ic) of Examples 82 to 84 of Table 3 were prepared.

EXAMPLE 85

3-{[4-(3, 5-Dinitro-thiophen-2-ylazo)-phenyl]-ethyl-amino}-propionic acid vinylester

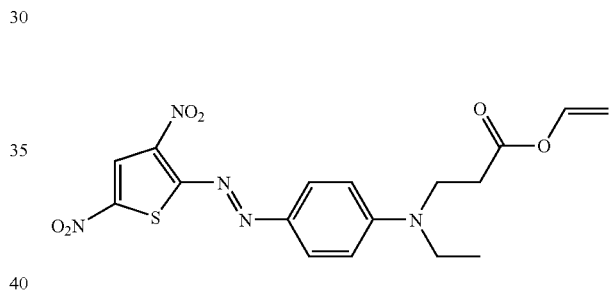

5.7 parts of 2-amino-3,5-dinitrothiophene, 20 parts of propionic acid and 30 parts of acetic acid were charged and cooled to 2° C. 11.4 parts of 40% (w/w) nitrosyl sulfuric acid were added, whilst the temperature was held below 4° C. The diazotization mixture was stirred for a further 2 hrs at 2-4° C. To a separate vessel were charged 6.5 parts of 3-(ethyl-phenyl-amino)-propionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed subsequently with water, methanol and again water, then dried to yield 7.4 parts of 3-{[4-(3,5-dinitro-thiophen-2-ylazo)-phenyl]-ethyl-amino}-propionic acid vinyl ester. λmax=626 nm (acetone).

When applied to polyester materials from an aqueous dispersion, blue shades with excellent wet and light fastness properties were seen.

According to the procedure outlined in Example 85, the dyes of the formula (Id) of Examples 86 to 97 of Table 4 were prepared.

TABLE 4

(Id)

[Structure showing thiophene-azo-phenyl-amino-propionic acid vinyl ester with substituents G⁸, G⁹, G¹⁰, R¹, R⁴]

| Example | G¹⁰ | G⁹ | G⁸ | R¹ | R⁴ | λmax (nm) DMF |
|---|---|---|---|---|---|---|
| 86 | $CO_2C_2H_5$ | H | $NO_2$ | H | $C_2H_5$ | 602 |
| 87 | CN | Cl | CHO | H | $C_2H_5$ | 596 |
| 88 | CN | H | $N=NC_6H_4$-p-$NO_2$ | H | $C_2H_5$ | 662 |
| 89 | $NO_2$ | H | $NO_2$ | H | $CH_2C_6H_5$ | 629 |
| 90 | $CO_2C_2H_5$ | H | $NO_2$ | H | $CH_2C_6H_5$ | 584 |
| 91 | CN | Cl | CHO | H | $CH_2C_6H_5$ | 590 |
| 92 | $NO_2$ | H | $NO_2$ | $CH_3$ | $C_2H_5$ | 651 |
| 93 | $CO_2C_2H_5$ | H | $NO_2$ | $CH_3$ | $C_2H_5$ | 612 |
| 94 | CN | Cl | CHO | $CH_3$ | $C_2H_5$ | 610 |
| 95 | $NO_2$ | H | $NO_2$ | $CH_3$ | $CH_2C_6H_5$ | 645 |
| 96 | $CO_2C_2H_5$ | H | $NO_2$ | $CH_3$ | $CH_2C_6H_5$ | 605 |
| 97 | CN | Cl | CHO | $CH_3$ | $CH_2C_6H_5$ | 606 |

EXAMPLE 98

3-{Ethyl-[3-methyl-4-(5-nitro-thiazol-2-ylazo)-phenyl]-amino}-propionic acid vinyl ester

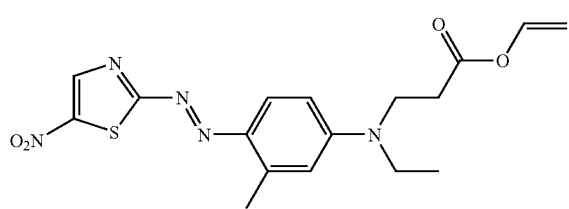

4.4 parts of 2-amino-5-nitrothiazole, 20 parts of propionic acid and 30 parts of acetic acid were charged and cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 7.0 parts of 3-(ethyl-[3-methylphenyl]-amino)-propionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed subsequently with water, methanol and again water, then dried to yield 9.5 parts of 3-{ethyl-[3-methyl-4-(5-nitro-thiazol-2-ylazo)-phenyl]-amino}-propionic acid vinyl ester. λmax=602 nm (DMF).

When applied to polyester materials from an aqueous dispersion, violet shades with excellent wet and light fastness properties were seen.

EXAMPLE 99

4-{[4-(2-Chloro-4-nitrophenylazo)-phenyl]-ethyl-amino}-butyric acid vinyl ester

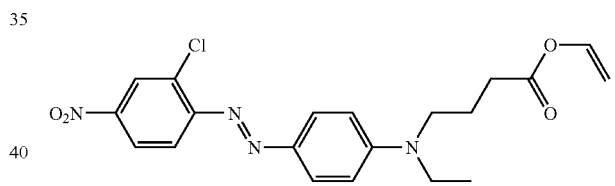

5.2 parts of 2-chloro-4-nitroaniline, 20 parts of propionic acid and 30 parts of acetic acid were charged and cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 7.0 parts of 4-(ethyl-phenyl-amino)-butyric acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 10.4 parts of 4-{[4-(2-chloro-4-nitrophenylazo)-phenyl]-ethyl-amino}-butyric acid vinyl ester. λmax=509 nm (DMF).

When applied to polyester materials from an aqueous dispersion, red shades with excellent wet and light fastness properties were seen.

According to the procedure outlined in Example 99, the dyes of the formula (Ie) of Examples 100 to 106 of Table 5 were prepared, with the exception of examples 102 and 106. In these cases, the diazotization was carried out in a mixture of sulfuric and phosphoric acid as described for example 81, rather than a mixture of propionic and acetic acid.

TABLE 5

Structure (Ie):

D—N=N—[phenyl with R¹]—N(ethyl)—CH₂CH₂CH₂—C(=O)—O—CH=CH₂

| Example | D | R¹ | λmax (nm) DMF |
|---|---|---|---|
| 100 | 2-methyl-5-nitro-benzonitrile group (O₂N—C₆H₃(CN)(CH₃)—) | H | 544 |
| 101 | 6-nitro-2-benzothiazolyl | H | 558 |
| 102 | 3-methyl-5-nitro-benzo[c]isothiazolyl | H | 612 |
| 103 | 2-methyl-5-nitro-benzonitrile group | CH₃ | 556 |
| 104 | 3-bromo-2-methyl-5-nitro-benzonitrile group | CH₃ | 572 |
| 105 | 6-nitro-2-methyl-benzothiazolyl | CH₃ | 568 |

TABLE 5-continued

Structure (Ie) (same as above)

| Example | D | R¹ | λmax (nm) DMF |
|---|---|---|---|
| 106 | 3-methyl-5-nitro-benzo[c]isothiazolyl | CH₃ | 628 |

EXAMPLE 107

3-{[4-(2-Chloro-4-nitrophenylazo)-phenyl]-ethyl-amino}-2-methyl-propionic acid vinyl ester

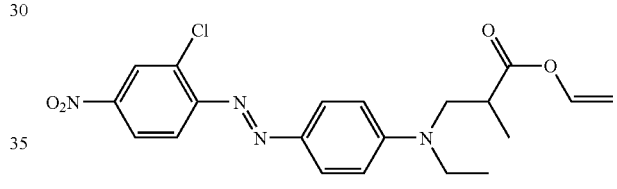

5.2 parts of 2-chloro-4-nitroaniline, 20 parts of propionic acid and 30 parts of acetic acid were charged and cooled to 5° C. 11.4 parts of 40% (w/w) nitrosyl sulfuric acid were added, whilst the temperature was held below 10° C. The diazotization mixture was stirred for a further 2 hrs at 5-10° C. To a separate vessel were charged 7.0 parts of 3-(ethyl-phenyl-amino)-2-methylpropionic acid vinyl ester, 100 parts of methanol, 1 part sulfamic acid and 100 parts of ice. With stirring, the diazotization mixture was slowly added followed by a further 300 parts of ice. The reaction mixture was stirred over night and the product was isolated by filtration, washed with water and dried to yield 9.4 parts of 3-{[4-(2-chloro-4-nitrophenylazo)-phenyl]-ethyl-amino}-2-methyl-propionic acid vinyl ester. λmax=511 nm (DMF).

When applied to polyester materials from an aqueous dispersion, red shades with excellent wet and light fastness properties were seen.

According to the procedure outlined in Example 107 the dyes of Examples 108 to 120 of Table 6 were prepared, with the exception of examples 109, 113, 116 and 120. In these cases, the diazotization was carried out in a mixture of sulfuric and phosphoric acid as described for example 81, rather than a mixture of propionic and acetic acid.

TABLE 6
(If)
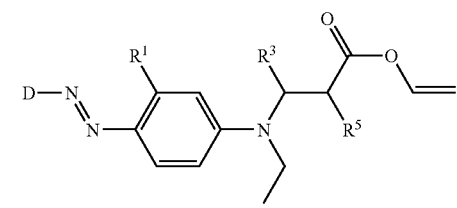
| Example | D | R¹ | R⁵ | R³ | λmax (nm) DMF |
|---|---|---|---|---|---|
| 108 | 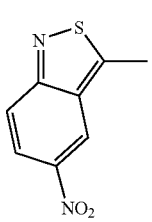 | H | CH₃ | H | 548 |
| 109 | 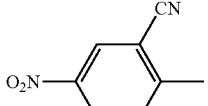 | H | CH₃ | H | 603 |
| 110 | 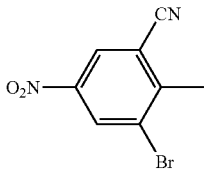 | CH₃ | CH₃ | H | 550 |
| 111 | 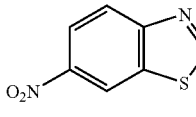 | CH₃ | CH₃ | H | 558 |
| 112 | 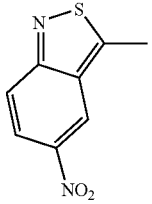 | CH₃ | CH₃ | H | 563 |
| 113 | 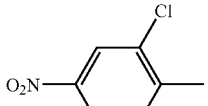 | CH₃ | CH₃ | H | 622 |
| 114 | 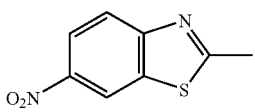 | H | H | CH₃ | 517 |
| 115 |  | H | H | CH₃ | 556 |

TABLE 6-continued (If)

[Structure: D—N=N—phenyl(R¹)—N(ethyl)—CH(R³)—CH(R⁵)—C(=O)—O—CH=CH₂]

| Example | D | R¹ | R⁵ | R³ | λmax (nm) DMF |
|---|---|---|---|---|---|
| 116 | 3-methyl-5-nitro-benzo[c]isothiazol-yl | H | H | CH₃ | 611 |
| 117 | 2-methyl-4-nitro-6-cyano-phenyl | CH₃ | H | CH₃ | 558 |
| 118 | 2-methyl-3-bromo-5-nitro-6-cyano-phenyl | CH₃ | H | CH₃ | 567 |
| 119 | 2-methyl-6-nitro-benzothiazol-yl | CH₃ | H | CH₃ | 568 |
| 120 | 3-methyl-5-nitro-benzo[c]isothiazol-yl | CH₃ | H | CH₃ | 626 |

EXAMPLE 121

A textile fabric of polyester was pretreated using a liquor comprising 50g/l of a 8% sodium alginate solution, 100 g/l of a 8-12% galactomannane solution and 5g/l of sodium dihydrogen phosphate in water and then dried. The wet pickup is 70%. The thus pretreated textile was printed with an aqueous ink containing 6% of the dyestuff according to example 1
1.5% of dispersing agent Disperbyk 190
10% of 2-propanol
20% of polyethylene glycol 200
0.01% of biocide Mergal K9N and
62.49% of water using a drop-on-demand (bubble jet) inkjet print head. The print is completely dried.

It is fixed by means of saturated steam at 175° C. for 7 minutes.

The print is then rinsed warm, subjected to a fastness wash with hot water at 95° C., rinsed warm and then dried.

The result is a print having excellent use and wash fastness.

The invention claimed is:

1. A dyestuff of the formula (I)

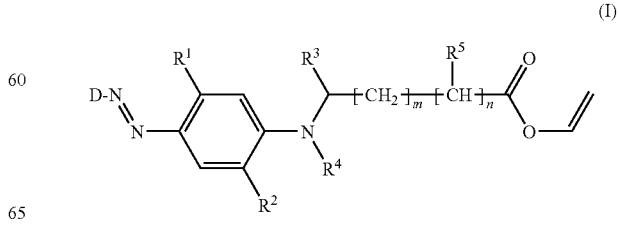

(I)

wherein
D is of the formula (IIa)

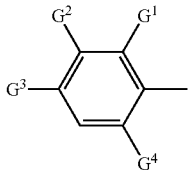
(IIa)

wherein
G¹ is hydrogen, halogen, cyano or nitro;
G² is hydrogen, halogen or nitro;
G³ is hydrogen, halogen, methylsulfonyl, fluorosulfonyl or nitro; and
G⁴ is hydrogen, halogen, trifluoromethyl, cyano or nitro;
or of the formula (IIb)

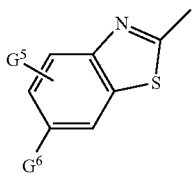
(IIb)

wherein
G⁵ is hydrogen or halogen; and
G⁶ is hydrogen, halogen, nitro, —SO₂CH₃ or —SCN;
or of the formula (IIc)

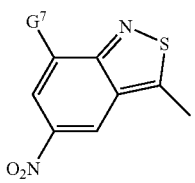
(IIc)

wherein
G⁷ is hydrogen or halogen,
or of the formula (IId)

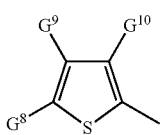
(IId)

wherein
G⁸ is nitro, cyano, —CHO or a group of the formula (IIe)

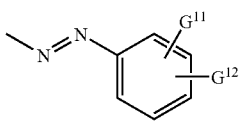
(IIe)

wherein G¹¹ and G¹² are independently hydrogen, halogen, nitro or cyano;
G⁹ is hydrogen or halogen; and
G¹⁰ is nitro, cyano, —COCH₃ or —COO—G¹³, wherein G¹³ is C₁-C₄ alkyl;
or of the fomula (IIf);

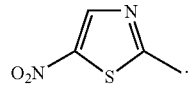
(IIf)

R¹ is hydrogen, (C₁-C₄)-alkyl, hydroxy, —NHCOR⁶ or —NHSO₂R⁶;
R² is hydrogen, halogen or (C₁-C₄)-alkoxy;
R³ is hydrogen or methyl;
R⁴ is hydrogen, (C₁-C₆)-alkyl, substituted (C₁-C₆)-alkyl, (C₂-C₆)-alkyl, which is interrupted by 1, 2 or 3 heteroatoms wherein said heteroatoms are —O—, —S— or —NR⁷, substituted (C₂-C₆)-alkyl, which is interrupted by 1, 2 or 3 heteroatoms wherein said heteroatoms are —O—, —S— or —NR⁷, (C₂-C₆)-alkenyl, substituted (C₂-C₆)-alkenyl, benzyl or phenethyl;
R⁵ is hydrogen or methyl;
R⁶ is (C₁-C₄)-alkyl, phenyl or substituted phenyl;
R⁷ is (C₁-C₄)-alkyl, phenyl or substituted phenyl;
m is 0, 1 or 2; and
n is 0 or 1 with a proviso that when D represents formula (IIa), m is 0.

2. The dyestuff according to claim 1, wherein D derives from the following amines: 3,4-dichloroaniline, 2-trifluoromethyl-4-nitroaniline, 2-nitroaniline, 3-nitroaniline, 4-nitroaniline, 2-chloro-4-nitroaniline, 4-chloro-2-nitroaniline, 2-bromo-4-nitroaniline, 2-chloro-4-methylsulfonylaniline, 2,6-dichloro-4-nitroaniline, 2,6-dibromo-4-nitroaniline, 2-chloro-6-bromo-4-nitroaniline, 2,5-dichloro-4-nitroaniline, 2-cyano-4-nitroaniline, 2-cyano-6-chloro-4-nitroaniline, 2-cyano-6-bromo-4-nitroaniline, 2,4-dintroaniline, 2-chloro-4,6-dinitroaniline, 2-bromo-4,6-dinitroaniline, 2-amino-5-nitrothiazole, 2-amino-3,5-dinitrothiophene, 2-amino-5-nitrothiophene-3-carboxylic acid ethyl ester, 2-amino-3-cyano-4-chloro-5-formylthiophene, 2-amino-5-(4-nitrophenylazo)-thiophene-3-carbonitrile, 7-amino-5-nitrobenzoisothiazole, 2-amino-6-nitrobenzothiazole, 2-amino-6-methylsulfonyl-benzothiazole, 2-amino-6-thiocyanatobenzothiazole or 2-amino-6,7-dichlorobenzothiazole.

3. The dyestuff according to claim 1, wherein
R¹ is hydrogen, methyl or —NHCOCH₃;
R² is hydrogen, chloro, methoxy or ethoxy;
R³ is hydrogen or methyl;
R⁴ is hydrogen, methyl, ethyl, n-propyl, i-propyl, n-butyl, sec-butyl, i-butyl, tert.-butyl, benzyl, —CH₂—O—CH₂— or —(CH₂)₂—O—(CH₂)₂-;
R⁵ is hydrogen or methyl;
m is 0, 1 or 2;
n is 0 or 1.

4. The dyestuff according to claim 1, wherein
R¹ is hydrogen, methyl or —NHCOCH₃;
R² is hydrogen, chloro, methoxy or ethoxy;
R³ is hydrogen or methyl;
R⁴ is hydrogen, methyl, ethyl, n-propyl, i-propyl, n-butyl, sec-butyl, i-butyl, tert.-butyl, benzyl, —CH₂—O—CH₂— or —(CH₂)₂—O—(CH₂)₂-;
R⁵ is hydrogen or methyl;
m is 1 or 2;
n is 0 or 1.

5. The dyestuff according to claim 2, wherein
R$^1$ is hydrogen, methyl or —NHCOCH$_3$;
R$^2$ is hydrogen, chloro, methoxy or ethoxy;
R$^3$ is hydrogen or methyl;
R$^4$ is hydrogen, methyl, ethyl, n-propyl, i-propyl, n-butyl, sec-butyl, i-butyl, tert.-butyl, benzyl, —CH$_2$—O—CH$_2$— or —(CH$_2$)$_2$—O—(CH$_2$)$_2$—;
R$^5$ is hydrogen or methyl;
m is 1 or 2;
n is 0 or 1.

6. The dyestuff according to claim 1, wherein m is 2 and n is 0.

7. The dyestuff according to claim 1, wherein m is 2, n is 0 and
D is of the formula (IIb).

8. The dyestuff according to claim 1, wherein
m is 2,
n is 0,
D is of the formula (IIc) and
G$^7$ is hydrogen.

9. The dyestuff according to claim 1, wherein
m is 2,
n is 0 and
D is of the formula (IId).

10. The dyestuff according to claim 1, wherein
m is 2,
n is 0 and
D is of the formula (IIe).

11. The dyestuff according to claim 1, wherein
m is 2,
n is 0 and
D is of the formula (IIf).

12. A process for the preparation of the dyestuff as claimed in claim 1, which comprises diazotisation of an amine of the formula (III)

D-NH$_2$     (III)

wherein D is of the formula (IIa), (IIb), (IIc), (IId), (IIe) or (IIf);
and coupling onto a compound of the formula (IV)

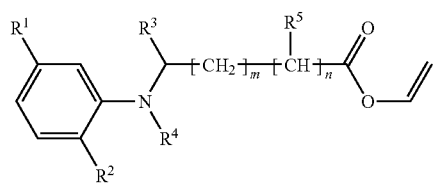

(IV)

wherein
R$^1$ is hydrogen, (C$_1$-C$_4$)-alkyl, hydroxy, —NHCOR$^6$ or —NHSO$_2$R$^6$;
R$^2$ is hydrogen, halogen or (C$_1$-C$_4$)-alkoxy;
R$^3$ is hydrogen or methyl;
R$^4$ is hydrogen, (C$_1$-C$_6$)-alkyl, substituted (C$_1$-C$_6$)-alkyl, (C$_2$-C$_6$)-alkyl, which is interrupted by 1, 2 or 3 heteroatoms wherein said heteroatoms are —O—, —S— or —NR$^7$, substituted (C$_2$-C$_6$)-alkyl, which is interrupted by 1, 2 or 3 heteroatoms wherein said heteroatoms are —O—, —S— or —NR$^7$, (C$_2$-C$_6$)-alkenyl, substituted (C$_2$-C$_6$)-alkenyl, benzyl or phenethyl;
R$^5$ is hydrogen or methyl;
R$^6$ is (C$_1$-C$_4$)-alkyl, phenyl or substituted phenyl;
R$^7$ is (C$_1$-C$_4$)-alkyl, phenyl or substituted phenyl;
m is 0, 1 or 2; and
n is 0 or 1 with a proviso that when D represents formula (IIa), m is 0.

13. The process as claimed in claim 12, wherein D is of the formula (IIa)

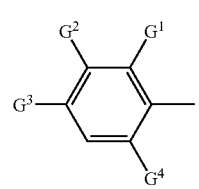

(IIa)

wherein
G$^1$ is hydrogen, halogen, cyano or nitro;
G$^2$ is hydrogen, halogen or nitro;
G$^3$ is hydrogen, halogen, methylsulfonyl, fluorosulfonyl or nitro; and
G$^4$ is hydrogen, halogen, trifluoromethyl, cyano or nitro;
or of the formula (IIb)

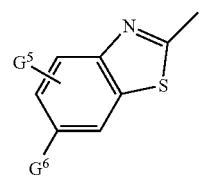

(IIb)

wherein
G$^5$ is hydrogen or halogen; and
G$^6$ is hydrogen, halogen, nitro, —SO$_2$CH$_3$ or —SCN;
or of the formula (IIc)

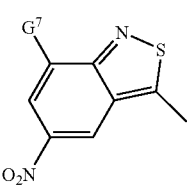

(IIc)

wherein
G$^7$ is hydrogen or halogen;
or of the formula (IId)

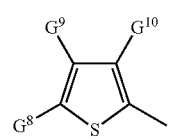

(IId)

wherein
G$^8$ is nitro, cyano, —CHO or a group of the formula (IIe)

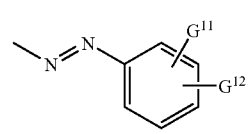

(IIe)

wherein $G^{11}$ and $G^{12}$ are independently hydrogen, halogen, nitro or cyano;
$G^9$ is hydrogen or halogen; and
$G^{10}$ is nitro, cyano, —COCH$_3$ or —COO—$G^{13}$, wherein $G^{13}$ is $C_1$-$C_4$ alkyl;
or of the fomula (IIf)

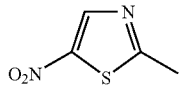

(IIf)

m is 2 and n is 0 with a proviso that when D represents formula (IIa), m is 0.

14. A process for dyeing and printing of synthetic textile material and fibre blends thereof which comprises contacting the material with the dyestuff as claimed in claim 1.

15. An ink for injet printing which contains at least one dyestuff of the formula (I) according to claim 1.

* * * * *